(12) United States Patent
Petschenka-Rininsland et al.

(10) Patent No.: US 10,097,107 B2
(45) Date of Patent: Oct. 9, 2018

(54) METHOD FOR OPERATING AND INVERTER, INVERTER, AND PHOTOVOLTAIC SYSTEM

(71) Applicant: SMA Solar Technology AG, Niestetal (DE)

(72) Inventors: Josef Petschenka-Rininsland, Kassel (DE); Cornelius Fuetterer, Gernrode (DE)

(73) Assignee: SMA Solar Technology AG, Niestetal (DE)

( * ) Notice: Subject to any disclaimer, the term of this patent is extended or adjusted under 35 U.S.C. 154(b) by 0 days.

(21) Appl. No.: 15/875,546

(22) Filed: Jan. 19, 2018

(65) Prior Publication Data

US 2018/0145610 A1    May 24, 2018

Related U.S. Application Data

(63) Continuation of application No. PCT/EP2016/066092, filed on Jul. 7, 2016.

(30) Foreign Application Priority Data

Jul. 21, 2015    (DE) ........................ 10 2015 111 804

(51) Int. Cl.
*H02M 7/5387* (2007.01)
*H02S 50/00* (2014.01)
*H02H 3/16* (2006.01)

(52) U.S. Cl.
CPC ............ *H02M 7/5387* (2013.01); *H02H 3/16* (2013.01); *H02M 7/53875* (2013.01); *H02S 50/00* (2013.01)

(58) Field of Classification Search
CPC .... H02H 7/122; H02H 7/1222; H02H 7/1227; H02H 1/0015; H02H 3/105; H02H 3/16;
(Continued)

(56) References Cited

U.S. PATENT DOCUMENTS

| | | | | |
|---|---|---|---|---|
| 2001/0048605 A1* | 12/2001 | Kurokami | ............ | H02J 7/0052 363/56.03 |
| 2009/0121549 A1* | 5/2009 | Leonard | ................ | H02M 3/156 307/51 |

(Continued)

OTHER PUBLICATIONS

International Search Report dated Oct. 19, 2016 for International Application PCT/EP2016/066092.

(Continued)

*Primary Examiner* — Nguyen Tran
(74) *Attorney, Agent, or Firm* — Eschweiler & Potashnik, LLC (57) ABSTRACT

A method for operating an inverter, the DC voltage input of which is connected to a positive pole (PV+) and to a negative pole (PV−) of a PV generator and the AC voltage output of which is connected to an AC grid via a transformer, is disclosed. The method includes determining a potential of the positive pole and/or the negative pole ($U_{PV+}$, $U_{PV-}$) of the PV generator with respect to a ground potential by a monitoring circuit, and selecting a modulation method for controlling power switches of the inverter from a number of modulation methods stored in a storage device of the inverter based on the determined potential ($U_{PV+}$, $U_{PV-}$) such that a voltage stress on components of the PV system arranged on the AC side, with respect to ground, is reduced. The method further includes using the selected modulation method to control the power switches for the purpose of converting a DC input voltage into an AC output voltage.

12 Claims, 5 Drawing Sheets

(58) Field of Classification Search
CPC ...... H02H 3/162; H02M 1/32; H02M 7/5387; H02M 7/53871; H02M 1/34; H02M 3/33507; H02M 1/38
USPC .................................................. 363/55–58
See application file for complete search history.

(56) References Cited

U.S. PATENT DOCUMENTS

| | | |
|---|---|---|
| 2011/0273017 A1 | 11/2011 | Borup et al. |
| 2013/0051092 A1* | 2/2013 | Cooper ................... H02J 3/383 363/37 |
| 2014/0306544 A1 | 10/2014 | Hantschel et al. |
| 2014/0376293 A1 | 12/2014 | West |

OTHER PUBLICATIONS

An, Shaoliang et al. "Neutral Point Voltage-Balanced Control Method Based on Discontinuous Pulse Width Modulation for a NPC 3-level Inverter." 9th International Conference on Power Electronics-ECCE Asia, Jun. 1-5, 2015/63 Convention Center, Seoul, Korea. pp. 2820-2825.

Lee, Hyeoun-Dong et al. "A New Space Vector Pulsewidth Modulation Strategy for Reducing Ground to Stator-Neutral Voltage in Inverter-Fed ac Motor Drives." 2000 IEEE. XP-001036229. pp. 918-923.

* cited by examiner

METHOD FOR OPERATING AND INVERTER, INVERTER, AND PHOTOVOLTAIC SYSTEM

CROSS-REFERENCE TO RELATED APPLICATIONS

This application is a continuation of PCT Patent Application Number PCT/EP2016/066092, filed on Jul. 7, 2016, which claims priority to German Patent Application Number DE 10 2015 111 804.1, filed on Jul. 21, 2015, which are hereby incorporated by reference in their entirety.

FIELD

The disclosure relates to a method for operating an inverter, the DC voltage input of which is connected to a positive pole and to a negative pole of a PV generator and the AC voltage output of which is connected to an AC grid via a transformer, to a photovoltaic system and to an inverter which is configured to carry out such a method.

BACKGROUND

Photovoltaic generators or PV generators for short are used, as part of photovoltaic systems (PV systems), to convert solar energy into electrical energy. In this case, the PV generators usually comprise a plurality of photovoltaic modules (PV modules) each in turn having a multiplicity of photovoltaic cells (PV cells). The PV generators are generally coupled to an inverter which converts the DC voltage generated by the PV generators into an AC voltage in order to feed the latter into a public power grid or into a private power grid (so-called island grid). In this case, in order to increase the voltage, the output voltage of the inverter can be increased to a higher voltage by means of a transformer in order to be able to directly feed into a medium-voltage or high-voltage grid, for example.

Depending on the intended purpose and the amount of the electrical power produced, the structure of such PV systems varies considerably. The AC voltage generated by the inverter can therefore differ, for example, both with regard to its amplitude, its frequency and in the number of phases. Inverters which have a low output power often have a single-phase design and those which output a high power have a three-phase design. However, depending on the design of the grid to which these inverters are connected, other embodiments are also conceivable.

The output voltage of the PV generators is usually between 500 and 1000 V, but there are currently attempts to increase this voltage to 1500 V. Selecting a relatively high DC voltage reduces resistive losses in the DC lines running between the PV generators and the inverters. However, this also results in technical problems, for example with regard to the level of the insulation voltages and, associated with this, the load on the individual components of the PV system. This relates both to components arranged on the DC side and to components arranged on the AC side, for example the transformer or the semiconductor switches of the inverter.

In PV systems in which a transformer is arranged between the AC voltage output of the inverter and the AC grid, the system part from the PV generator to the transformer is initially potential-free. As a result of insulation resistances which are not endlessly high, in particular of DC lines running between the PV generators and the inverters, a potential is established at the positive and negative poles during operation, which potential is approximately symmetrical around ground potential. In the case of a photovoltaic voltage of 1000 V, for example, at the output of a PV generator, the negative pole of the PV generator is at a potential of approximately −500 V with respect to ground potential and the positive pole is at a potential of approximately +500 V with respect to ground potential. Owing to the design, an excessively high negative potential of the PV module or parts of the PV module with respect to ground potential is undesirable in some types of PV modules or an excessively high positive potential of the PV module or parts of the PV module with respect to ground potential is undesirable in other types. Different measures for setting the potentials with respect to ground potential can then be taken. A distinction is made here, for example, between direct (rigid) grounding of a pole of the PV generator, so-called PV+ or PV− grounding, and indirect grounding variants in which the potentials with respect to ground result from (system-related) impedances or from the deliberate introduction of impedances between a pole of the PV generator and ground. In addition, there are also more complex apparatuses which allow targeted potential control. Numerous documents describe corresponding apparatuses which allow the potential of a pole of the PV generator to be shifted. By way of example, the documents DE202006008936 U1, EP2136449 B1 and DE102010060463 B4 are cited here.

Semiconductor switches, for example MOSFETs or IGBTs, are used in the currently customary inverter topologies, for instance the B6 topology. In order to convert a DC voltage into an AC voltage, these semiconductor switches are controlled by means of suitable driver circuits. This is generally referred to as clocking of the semiconductor switches. In this case, very different clocking methods can be used; so-called pulse width modulation methods (PWM methods) are widespread. An insight into these methods is provided, for example, by J. Holtz, "*Pulsewidth modulation-A survey,*" in Proc. IEEE PESC'92, 1992, p. 11-18 or Kazmierkowski M. P., Dzieniakowski M. A. (1994): *Review of current regulation techniques for three-phase PWM inverters. IEEE Conference on Industrial Electronics, Control and Instrumentation, Record*, p. 567-575.

In the prior art, the selection of a PWM method suitable for a particular inverter or for a particular PV system is generally based on the fact that an appropriate method contributes, as far as possible, to reducing harmonics and/or minimizing the power loss, for example caused by switching losses. Which method ultimately provides particularly good results depends, inter alia, on the inverter topology. However, other components, for instance snubbers, and their interaction with the PWM method must also be taken into account.

In the known PWM modulation methods, a distinction is made, in particular, between so-called symmetrical and discontinuous or asymmetrical methods. In short, some switches of a bridge are clocked more frequently than others in the asymmetrical methods. In the case of a B6 bridge, the lower semiconductor switches (bottom) are clocked less frequently than the upper semiconductor switches (top) of the inverter bridge in a modulation method, for example. In another method, this relationship is reversed. Such methods are described, for example, in the publication M. RAJENDER REDDY, "SIMPLE AND NOVEL UNIFIED PULSE WIDTH MODULATION ALGORITHM FOR VOLTAGE SOURCE INVERTERS IN THE ENTIRE MODULATION RANGE", *Acta Electrotechnica et Infor-*

*matica*, Vol. 13, No. 3, 2013, p. 48-55, the content of which is therefore fully part of the present disclosure.

SHAOLIANG AN; LU LAI; XIANGDONG SUN; YANRU ZHONG; BIYING REN; QI ZHANG "Neutral point voltage-balanced control method based on discontinuous pulse width modulation for a NPC 3-level inverter", 2015 9th International Conference on Power Electronics and ECCE Asia (ICPE-ECCE Asia), 2015, p. 2820-2825, discloses a balancing method for the partial voltages in the intermediate circuit of an NPC solar inverter.

US20140 376 293A1 discloses an inverter having a midpoint grounded photovoltaic generator.

SUMMARY

The disclosure is directed to a method for operating an inverter, which method reduces the voltage load on, in particular, components of the PV system arranged on the AC side, with respect to ground by suitably selecting a modulation method for controlling the power switches of the inverter. This makes it possible to reduce a stress on the insulation at the undervoltage connection of the transformer, for example. This increases the service life of the stressed components.

In a method according to one embodiment of the disclosure for operating an inverter, the DC voltage input of the inverter is connected to a positive pole and to a negative pole of a PV generator, the AC voltage output of the inverter is connected to an AC grid via a transformer, and a potential of the positive and/or negative pole of the PV generator with respect to ground potential is determined by a monitoring means. A modulation method for controlling power switches of the inverter is selected from a number of modulation methods stored in a storage device of the inverter on the basis of this potential in such a manner that the voltage stress on components of the PV system arranged on the AC side, with respect to ground is reduced. The selected modulation method is used to control the power switches and therefore to convert the DC input voltage into an AC output voltage.

The present disclosure is based on the knowledge that, in PV systems which have a transformer and are connected to the AC voltage grid (AC grid) via such a transformer, the stress on, in particular, components of the PV system which are arranged on the AC side can be reduced by suitably selecting a modulation method for controlling the power switches of an inverter by taking into account the potentials of the positive and/or negative poles of the PV generators with respect to ground potential as criteria for selecting from the multiplicity of modulation methods which are known per se. The prior art does not contain any suggestion of using the potential difference of the PV generator or of its poles as a criterion to select a suitable PWM method.

In a method according to one embodiment of the disclosure, the modulation methods stored in the storage device of the inverter comprise, in particular, a modulation method referred to as a DPWMMIN method and/or a modulation method referred to as a DPWMMAX method. Details of these methods are found, for example, in the publication X. Yang, *"Generalized Space Vector Pulse Width Modulation Technique for Cascaded Multilevel Inverters"*; *International Journal of Control and Automation*, Vol. 7, No. 1 (2014), p. 11-26, the content of which is incorporated by reference and therefore fully part of the present disclosure.

One embodiment of the method according to the disclosure may provide for an absolute value of the potential of the positive pole with respect to ground to be compared with an absolute value of the potential of the negative pole with respect to ground.

In another embodiment of the method according to the disclosure, a first modulation method is selected if the absolute value of the potential of the positive pole with respect to ground is less than the absolute value of the potential of the negative pole with respect to ground and a second modulation method is selected if the absolute value of the potential of the positive pole with respect to ground is greater than the absolute value of the potential of the negative pole with respect to ground.

In one embodiment of the method according to the disclosure, the first modulation method is a DPWMMAX modulation method, and the second modulation method is a DPWMMIN modulation method.

When using the DPWMMAX modulation method, the upper semiconductor switches referred to as the top are clocked more rarely than the lower semiconductor switches referred to as the bottom on temporal average in a B6 bridge, as already mentioned above by way of example. In contrast, when using the DPWMMIN modulation method, the lower semiconductor switches referred to as the bottom are clocked more rarely than the upper semiconductor switches referred to as the top on temporal average in a B6 bridge. In one embodiment, if an ungrounded system is involved, with the result that the two absolute values mentioned are approximately equal to zero, the DPWMMIN modulation method is used.

In a method according to one embodiment of the disclosure, provision may be made for the method to be carried out before the inverter is connected to the AC grid and/or for the method to be carried out several times a day. Furthermore, provision may be made for the determination of the potential of the positive and/or negative pole of the PV generator with respect to ground potential by means of a monitoring means and the selection of the modulation method for controlling the power switches of the inverter from the number of modulation methods stored in the storage device of the inverter on the basis of the previously determined potential to be carried out before the inverter is connected to the AC grid. In another embodiment of the method according to the disclosure, the determination of the potential of the positive and/or negative pole of the PV generator with respect to ground potential by means of a monitoring means and the selection of the modulation method for controlling the power switches of the inverter from the number of modulation methods stored in the storage device of the inverter on the basis of the previously determined potential are carried out while the inverter is connected to the AC grid. In this case, it is also conceivable in one embodiment for the method to be carried out continuously. The absolute values of the potentials of the positive and negative poles with respect to ground could therefore be permanently monitored. If it emerges in this case that the conditions have changed with respect to those which were present when selecting the modulation method in such a manner that a different modulation method should now be selected, the more suitable modulation method is selected. In order to avoid continuously changing between different modulation methods, provision may be made in one embodiment for a change from the modulation method selected at an earlier first time to another modulation method to be carried out at a time only when the difference between the two times is greater than a minimum period of 1 minute, for example. Instead of specifying a minimum period, it is also possible to specify a threshold value $U_{Schwell}$ for the level of the required changes in the difference in the absolute values of the potentials of the positive and negative poles with respect to ground. This threshold value is determined on the basis of the voltage difference between the positive and negative poles of the PV generator, for example as a percentage thereof, or can be specified as a fixed value, for example 50 V. A change from the modulation method selected at a first time to another modulation method is carried out when a difference in the absolute values of the potentials of the positive pole and of the negative pole with respect to ground at a second time differs in terms of the sign from a difference determined at the earlier first time and an absolute value of the difference in the absolute values of the potentials of the positive and negative poles with respect to ground at the two times is greater than a threshold value of, for example, 50 V, that is to say if the following applies:

$$\|(|U_{PV+}|-|U_{PV-}|)_{t=t1}|-|(|U_{PV+}|-|U_{PV-}|)_{t=t2}\| > U_{Schwell}$$

In another embodiment of the disclosure, a PV system has a PV generator and an inverter connected to the PV generator via a positive pole and a negative pole. The PV system has a transformer and is connected to an AC voltage grid via said transformer; it also has a monitoring means for determining a potential of the positive and/or negative pole of the PV generator with respect to ground potential. The inverter has a storage device for storing information for carrying out at least two different modulation methods and comprises power switches and means for controlling these power switches in order to convert a DC input voltage into an AC output voltage. The inverter also has a controller which comprises means for communicating with the monitoring means and for selecting a modulation method for controlling power switches of the inverter from the modulation methods stored in the storage device of the inverter on the basis of the previously determined potential of the positive and/or negative pole with respect to ground potential.

An inverter according to the disclosure has power switches and a means for controlling these power switches for the purpose of converting a DC input voltage into an AC output voltage. The inverter has a storage device for storing information for carrying out at least two different modulation methods and a controller. The controller comprises means for communicating with a monitoring means and for selecting a modulation method for controlling the power switches of the inverter from the modulation methods stored in the storage device of the inverter on the basis of a previously determined potential of a positive and/or negative pole with respect to ground potential.

BRIEF DESCRIPTION OF THE DRAWINGS

The disclosure is described below with the aid of figures, in which.

DETAILED DESCRIPTION

Figure 1:
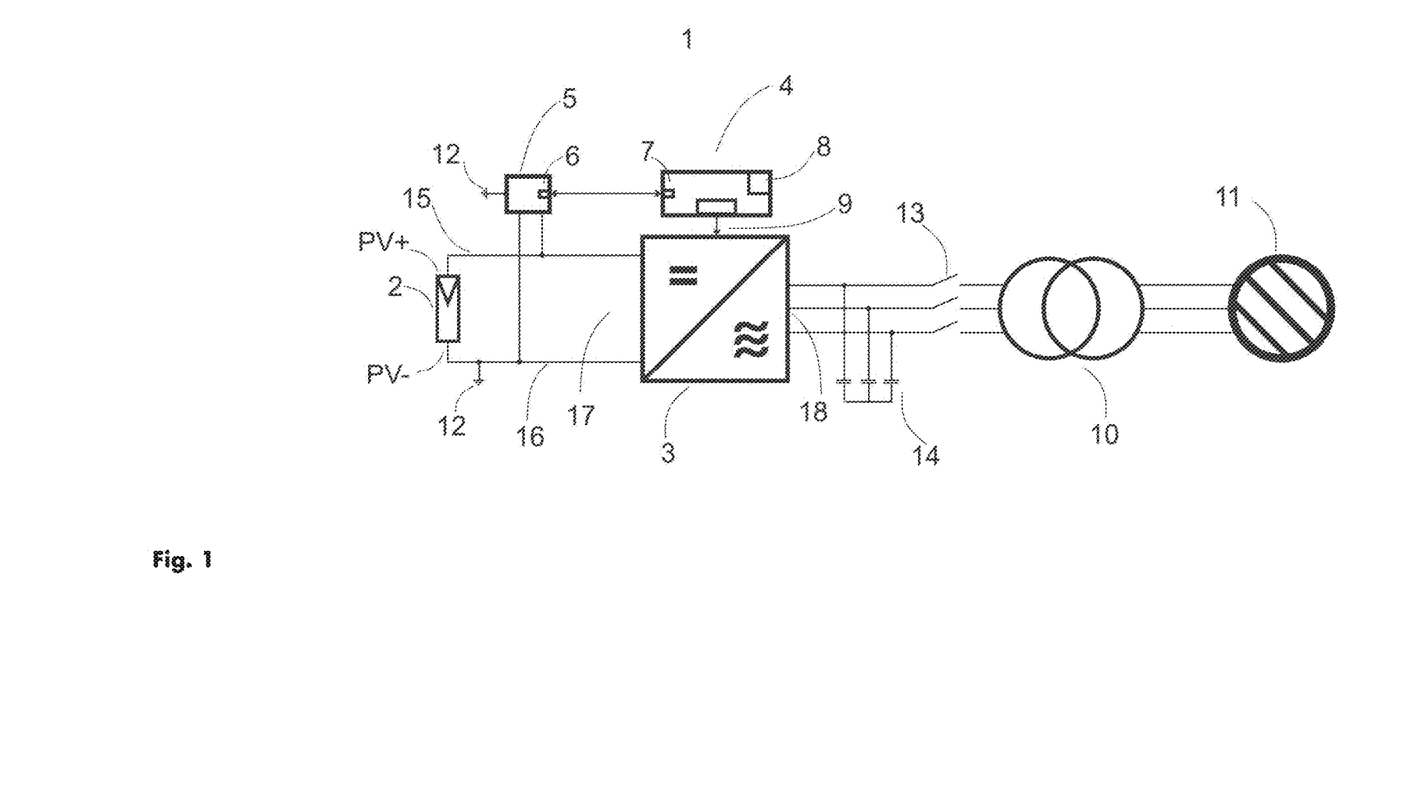
FIG. 1 shows a PV system according to the disclosure.

FIG. 1 shows a schematic illustration of a PV system 1 according to the disclosure. The positive pole PV+ and the negative pole PV− of the PV generator 2 are connected to the DC voltage input 17 of the inverter 3 via the DC voltage lines 15, 16. Details of the configuration of the inverter 3 and of the DC voltage intermediate circuit, for example intermediate circuit capacitances, fuse elements, etc., have been dispensed with for better clarity. In the present case, the negative pole PV− of the PV generator 2 is connected to ground potential 12.

FIG. 1 also shows a monitoring means 5 such as voltage monitoring circuitry for determining the potentials of the positive and negative poles ($U_{PV+}$, $U_{PV-}$) with respect to ground 12. In a manner differing from this, variants are also conceivable in which only one of the potentials $U_{PV+}$ or $U_{PV-}$ is determined. The potential which is not determined directly can be determined from the knowledge of a further variable, for instance an intermediate circuit voltage $U_{PV}$, that is to say the voltage between the DC voltage lines 15, 16.

The monitoring means 5 comprises means for communicating 6 at least with the controller 4 of the inverter 3. In this case, the type of configuration of the communication means 6 is not important. Both, wired and wireless circuits, structures and methods can therefore be used to transmit the information. Furthermore, it is irrelevant to the present disclosure whether the transmission is carried out on the basis of electrical, electromagnetic or other signals.

The controller 4 in turn has corresponding means for communicating 7 (e.g., same as means 6) with the monitoring means 5. In this case, the storage device 8, which is part of the controller 4 in the embodiment illustrated, is used to store all necessary information and all necessary parameters for carrying out at least two different modulation methods. The controller 4 also comprises means for controlling 9 the power switches of the inverter 3.

The AC voltage output 18 of the inverter 3 is connected to an AC grid 11 via AC-side disconnecting elements 13 and a transformer 10. In FIG. 1, the inverter has a three-phase design on the AC side and has an AC-side filter 14. Further details have also been dispensed with here again for better clarity and only the components needed to understand the disclosure have been depicted.

Figure 2:
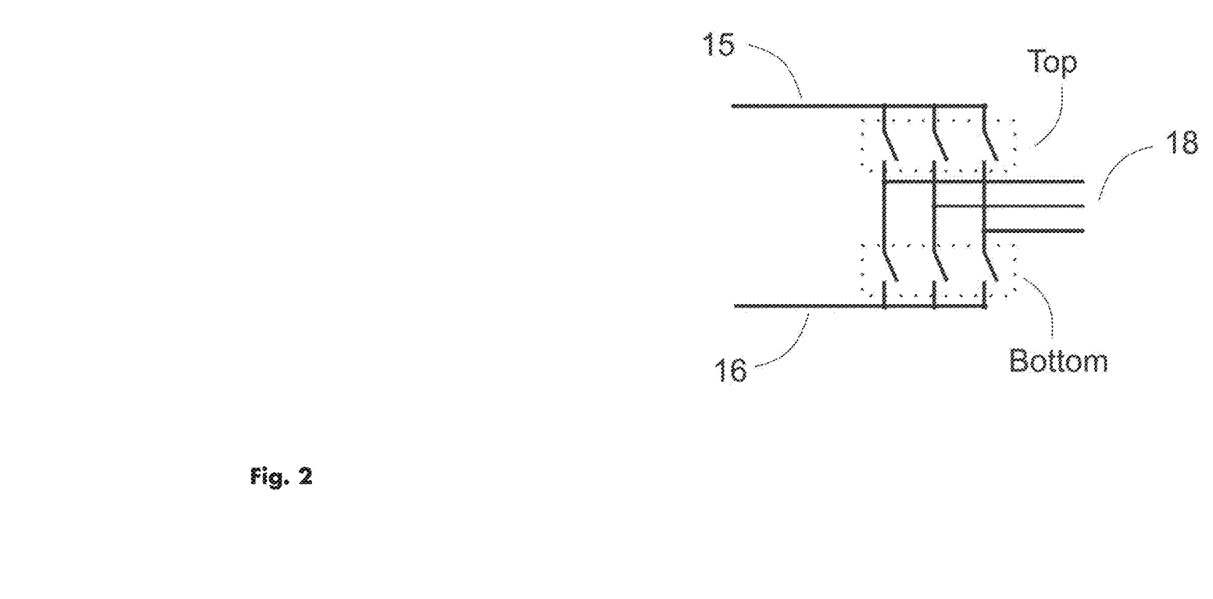
FIG. 2 shows a simplified illustration of a B6 bridge.

FIG. 2 shows a highly simplified illustration of a so-called B6 bridge, as can be used, for example, in the three-phase inverter 3 illustrated in FIG. 1. In this case, the upper semiconductor switches are referred to as the top and the lower semiconductor switches are referred to as the bottom.

Figure 3:
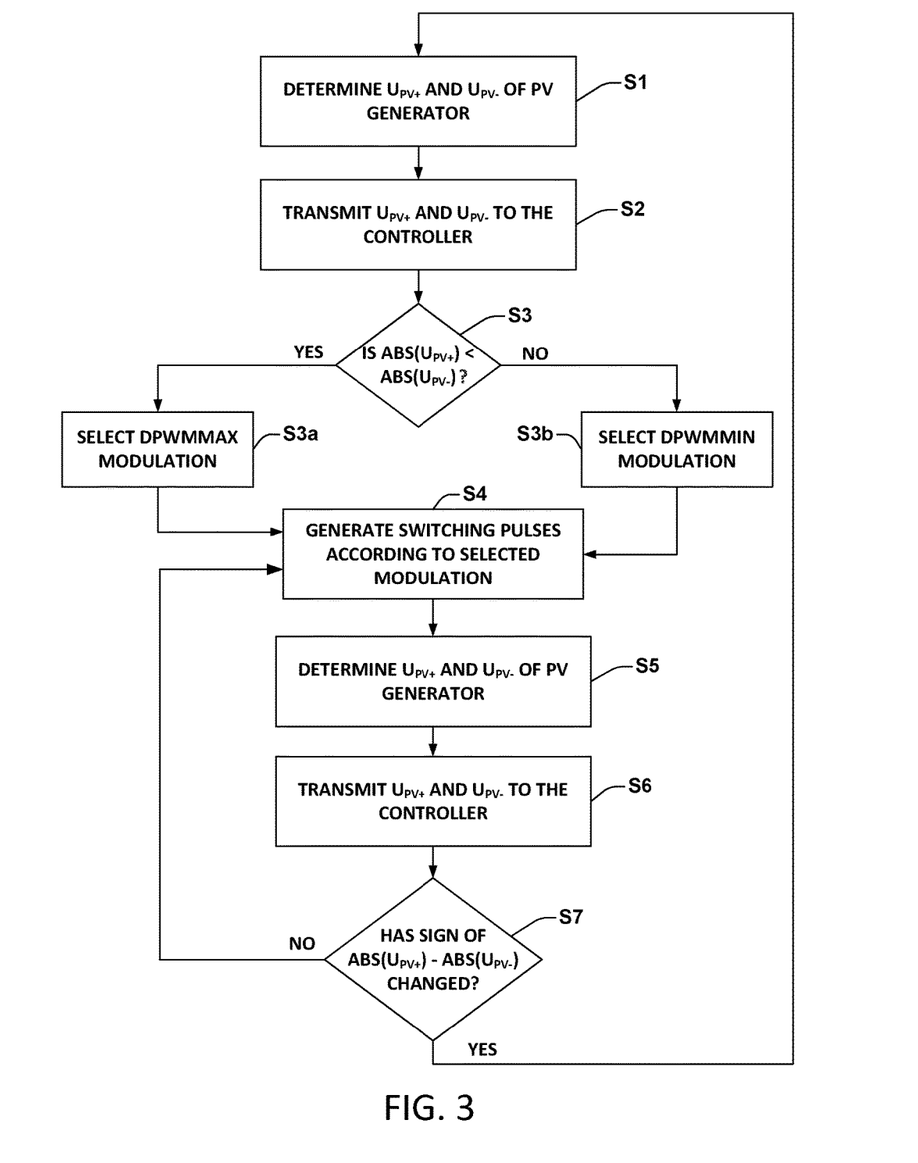
FIG. 3 shows a flowchart of one embodiment of the method according to the disclosure.

FIG. 3 shows a flowchart of one embodiment of the method according to the disclosure. At S1, the potentials of the positive and/or negative pole ($U_{PV+}$, $U_{PV-}$) of the PV generator 2 with respect to ground potential 12 are first of all determined at the time t1 by means of the monitoring means 5. These values are transmitted to the controller 4 with the aid of the communication means 6, 7 at S2. These measured values are evaluated there at S3. For this purpose, in one embodiment the absolute values of the potentials of the positive and negative poles ($U_{PV+}$, $U_{PV-}$) of the PV generator 2 with respect to ground potential 12 are compared with one another. If this comparison reveals that the absolute value of the potential of the positive pole PV+ with respect to ground ($|U_{PV+}|$) is less than the absolute value of the potential of the negative pole PV− with respect to ground ($|U_{PV-}|$), the so-called DPWMMAX modulation method is selected at S3a. If, in the reverse case, the absolute value of the potential of the positive pole PV+ with respect to ground ($|U_{PV+}|$) is greater than the absolute value of the potential of the negative pole PV− with respect to ground ($|U_{PV-}|$), the DPWMMIN modulation method is selected at S3b. In an alternative embodiment, the potentials are evaluated inside the monitoring means 5 in the manner described above.

According to the result of the evaluation at S3, the means for controlling 9 the power switches generates switching pulses corresponding to the selected modulation method at S4 in order to clock the semiconductor switches top, bottom of the inverter bridge according to the selected modulation method.

At S5 and S6, the potentials $U_{PV+}$ and $U_{PV-}$ are determined again by the monitoring means 5 and the measured values are evaluated in a similar manner to act S3 at a time t2 at S7. This operation can take place in a quasi-continuous manner, with the result that corresponding measured values are continuously recorded and evaluated, or fixed times, intervals of time or other events, for example a renewed increase in the intermediate circuit voltage $U_{PV}$ after a rapid fall in the latter, can be used as an opportunity to determine and evaluate the potentials $U_{PV+}$ and $U_{PV-}$ again. However, a change to act S1 of the stated method is carried out only when the difference in the above-mentioned absolute values of the potentials $|U_{PV+}|-|U_{PV-}|$ at the current time t2 differs in terms of the sign (YES at S7) from that when selecting the currently used modulation method at the time t1 and the corresponding absolute value of the difference in the absolute values of the potentials of the positive and negative poles with respect to ground at the times t1, t2 is greater than a threshold value. If this is not the case (NO at S7), the original modulation method is maintained.

Figure 4A:
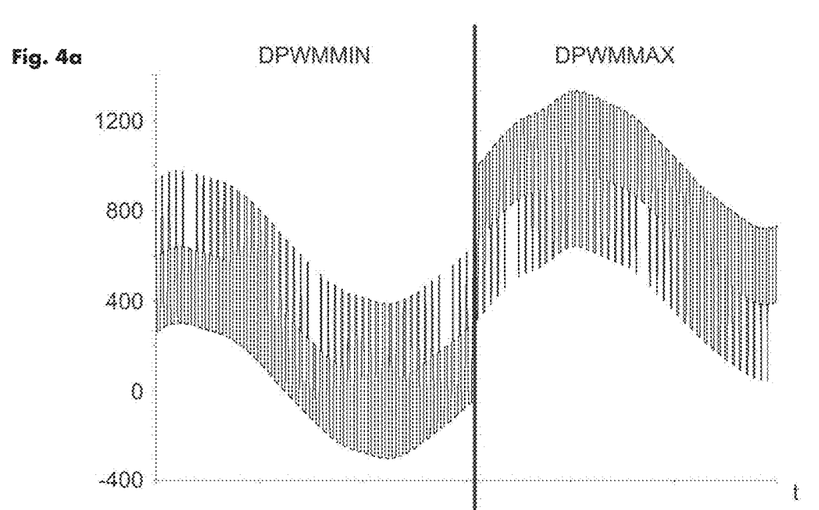
FIG. 4a shows the voltage profile of a phase with respect to ground for different modulation methods when grounding the negative pole.
Figure 4B:
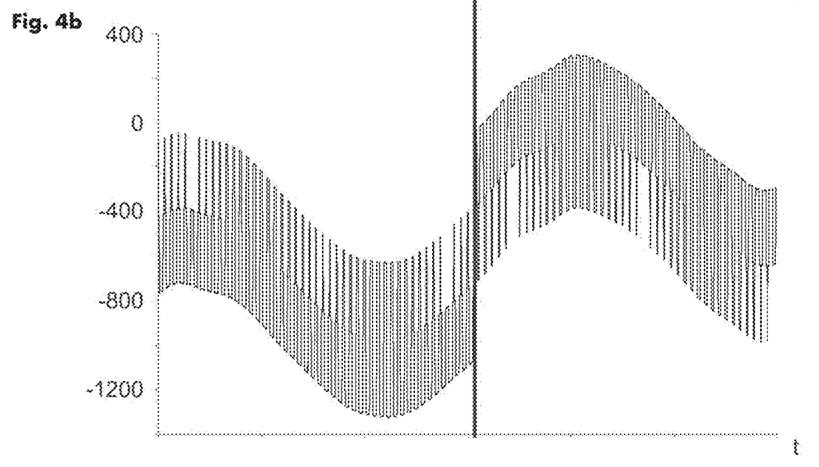
FIG. 4b shows the voltage profile of a phase with respect to ground for different modulation methods when grounding the positive pole of a PV generator.

FIGS. 4a and 4b illustrate, by way of example, the temporal profile of the voltage of one phase at the output of the inverter 3 with respect to ground for two different modulation methods when grounding the negative and/or positive pole (PV−, PV+) of the PV generator 2 with an intermediate circuit voltage $U_{PV}$ of 1000 V.

The respective graphs show very clearly the different influence of the modulation methods on the position of the output voltages of the inverter 3 with respect to ground potential 0. An arrangement is first of all considered in which the negative pole of the PV generator is grounded. In FIG. 4a, a voltage with respect to ground of at most 970 V is established in such a system when using the DPWMMIN modulation method, whereas the maximum is at 1330 V when using the DPWMMAX modulation method. In this case, the AC-side components are therefore subjected to less stress when using the DPWMMIN modulation method. The reverse situation is present in FIG. 4b when grounding the positive pole. In this case, the maximum absolute value of the voltage with respect to ground is 1330 V when using the DPWMMIN modulation method and is 970 V when using the DPWMMAX modulation method. In this case, it is therefore now more advantageous if the DPWMMAX modulation method is used in order to protect the above-mentioned components.

Figure 5:
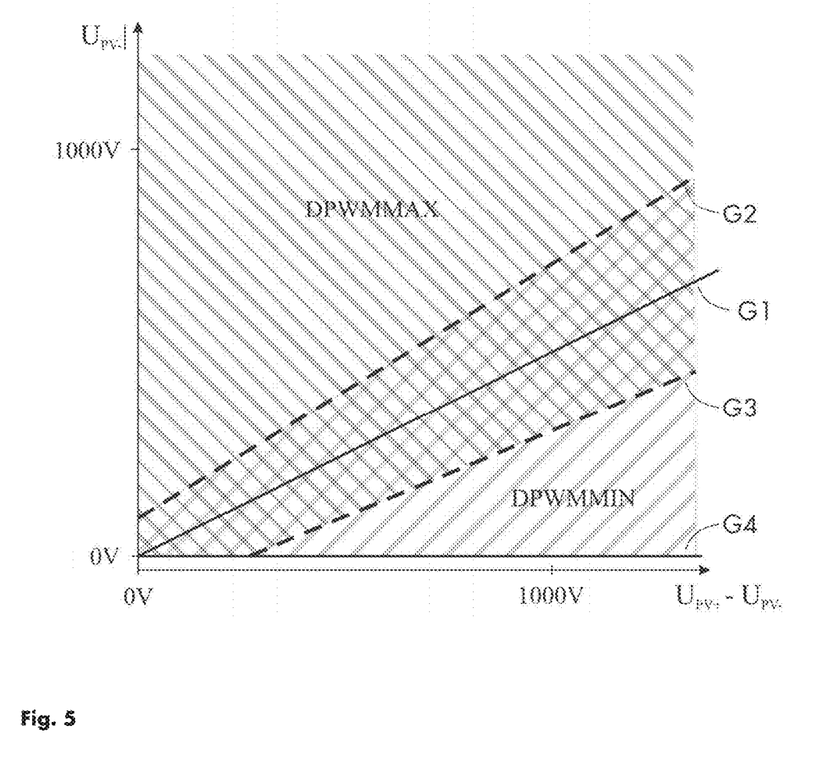
FIG. 5 shows a graph for illustrating the conditions for selecting the modulation methods.

FIG. 5 illustrates the absolute value of the potential of the negative pole PV− with respect to ground ($|U_{PV-}|$) as a function of the difference between the potential of the positive pole PV+ and the potential of the negative pole PV− of the PV generator with respect to ground potential ($U_{PV+}-U_{PV-}$). The straight line G1 arises for the situation in which neither the positive pole nor the negative pole of the PV generator is grounded. In this symmetrical case, $|U_{PV-}|=1/2(U_{PV+}-U_{PV-})$, that is to say the "operating points" are on this straight line for all radiation conditions.

In the case of the so-called PV+ grounding, a straight line having the gradient 1 (not illustrated in the graph) results within the graph. This straight line is therefore always above that of the symmetrical case G1 and the DPWMMAX modulation method should then be selected. In contrast, a straight line G4 having a gradient 0 runs along the abscissa in the case of the so-called PV− grounding. In such cases, the DPWMMIN modulation method should then be selected.

In addition to these cases which are static with respect to the grounding conditions, there are technically relevant cases in which, for example, one pole of the PV generator is held at a fixed voltage value which is not equal to ground potential, for example by specifying an external potential, or in which the potential of one pole of the PV generator with respect to ground is restricted to a maximum value. In these cases, for example in the event of changes in the radiation conditions, the operating point may shift from a range, in which one modulation method should be advantageously used, to another range in which another modulation method should be used. In such cases, there is therefore a change between different modulation methods—between two different modulation methods in the case illustrated—during operation of the inverter 3. In order to avoid a repeated change between the modulation methods in the transition range, it is possible either to specify a minimum period $\Delta t_{min}$ during which the modulation method cannot be changed again, as already described further above, or to define a range within which the existing modulation method is maintained, as is indicated in FIG. 5 by means of the double-hatched area between the two straight lines G2, G3 illustrated using dashed lines. If, for example, the operating point changes in such a manner that the absolute value of the potential of the negative pole PV− with respect to ground ($|U_{PV-}|$) becomes larger and the operating point changes from a range below the solid straight line G1 to the range above it, the modulation method (here DPWMMIN) is initially maintained. A change in the modulation methods, here to the DPWMMAX modulation method for example, is carried out only if the upper straight line G2 illustrated using dashed lines is exceeded. If the absolute value of the corresponding potential of the negative pole with respect to ground ($|U_{PV-}|$) is reduced again, the method changes to the DPWMMIN modulation method only when the current operating point undershoots the lower dashed straight line G3.

The invention claimed is:

1. A method for operating an inverter, the DC voltage input of which is connected to a positive pole (PV+) and to a negative pole (PV−) of a PV generator and the AC voltage output of which is connected to an AC grid via a transformer, the method comprising:
   determining a potential of the positive pole and/or the negative pole ($U_{PV+}$, $U_{PV-}$) of the PV generator with respect to a ground potential by a monitoring circuit,
   selecting a modulation method for controlling power switches of the inverter from a number of modulation methods stored in a storage device of the inverter based on the determined potential ($U_{PV+}$, $U_{PV-}$) such that a voltage stress on components of the PV system arranged on the AC side, with respect to ground, is reduced, and
   using the selected modulation method to control the power switches for the purpose of converting a DC input voltage into an AC output voltage.

2. The method as claimed in claim 1, wherein selecting the modulation method comprises comparing an absolute value of the potential of the positive pole with respect to ground ($|U_{PV+}|$) with an absolute value of the potential of the negative pole with respect to ground ($|U_{PV-}|$).

3. The method as claimed in claim 2, wherein a first modulation method is selected if the absolute value of the potential of the positive pole with respect to ground ($|U_{PV+}|$) is less than the absolute value of the potential of the negative pole with respect to ground ($|U_{PV-}|$) and a second, different modulation method is selected if the absolute value of the potential of the positive pole with respect to ground ($|U_{PV+}|$) is greater than the absolute value of the potential of the negative pole with respect to ground ($|U_{PV-}|$).

4. The method as claimed in claim 3, wherein the first modulation method is a DPWMMAX modulation method, and the second modulation method is a DPWMMIN modulation method.

5. The method as claimed in claim 1, wherein determining the potential of the positive pole and/or the negative pole ($U_{PV+}$, $U_{PV-}$) of the PV generator with respect to ground potential by the monitoring circuit and selecting the modulation method for controlling the power switches of the inverter from the number of modulation methods stored in the storage device of the inverter based on the determined potential ($U_{PV+}$, $U_{PV-}$) are carried out before the inverter is connected to the AC grid.

6. The method as claimed in claim 1, wherein determining the potential of the positive pole and/or the negative pole ($U_{PV+}$, $U_{PV-}$) of the PV generator with respect to ground potential by the monitoring circuit and selecting the modulation method for controlling the power switches of the inverter from the number of modulation methods stored in the storage device of the inverter based on the determined potential ($U_{PV+}$, $U_{PV-}$) are carried out while the inverter is connected to the AC grid.

7. The method as claimed in claim 1, wherein the method is carried out several times a day.

8. The method as claimed in claim 1, wherein the modulation methods stored in the storage device of the inverter comprise a DPWMMAX method and/or a DPWMMIN method.

9. The method as claimed in claim 1, wherein a change from the modulation method selected at an earlier first time t1 to another, different modulation method is carried out at a time t2 only when a difference between t1 and t2 is greater than a minimum period $\Delta t_{min}$.

10. The method as claimed in claim 1, wherein a change from the modulation method selected at a first time t1 to another, different modulation method is carried out when a difference in the absolute values of the potentials of the positive pole and of the negative pole with respect to ground ($|U_{PV+}|-|U_{PV-}|$) at a second time t2 differs in the terms of a sign from a difference determined at the earlier first time t1 and an absolute value of the difference in the absolute values of the potentials of the positive and negative poles with respect to ground at the times t1 and t2 is greater than a threshold value ($U_{Schwell}$).

11. A PV system comprising a PV generator and an inverter connected to the PV generator via a positive pole (PV+) and a negative pole (PV−),
wherein the PV system comprises a transformer and is connected to an AC voltage grid via said transformer,
wherein the PV system comprises a monitoring circuit configured to determine a potential of the positive pole and/or the negative pole ($U_{PV+}$, $U_{PV-}$) of the PV generator with respect to ground potential,
wherein the inverter comprises a storage device for storing information for carrying out at least two different modulation methods,
wherein the inverter further comprises power switches and a controller configured to control these power switches for the purpose of converting a DC input voltage into an AC output voltage,
wherein the controller further comprises communication circuitry configured to communicate with the monitoring circuit and for selecting a modulation method for controlling power switches of the inverter from the modulation methods stored in the storage device of the inverter based on the determined potential ($U_{PV+}$, $U_{PV-}$) of the positive pole and/or the negative pole with respect to ground potential.

12. An inverter configured to carry out the method as claimed in claim 1.

* * * * *